United States Patent
Booth, Jr.

(10) Patent No.: US 9,822,236 B2
(45) Date of Patent: Nov. 21, 2017

(54) POLYMER INTERLAYERS COMPRISING SPECIAL EFFECT METAL PIGMENTS

(71) Applicant: SOLUTIA INC., St. Louis, MO (US)

(72) Inventor: Howard D. Booth, Jr., Westfield, MA (US)

(73) Assignee: Solutia Inc., St. Louis, MO (US)

( * ) Notice: Subject to any disclaimer, the term of this patent is extended or adjusted under 35 U.S.C. 154(b) by 5 days.

(21) Appl. No.: 14/830,385

(22) Filed: Aug. 19, 2015

(65) Prior Publication Data
US 2016/0053084 A1    Feb. 25, 2016

Related U.S. Application Data (60) Provisional application No. 62/040,388, filed on Aug. 21, 2014.

(51) Int. Cl.
| | | |
|---|---|---|
| *C08K 3/34* | (2006.01) | |
| *C08K 5/11* | (2006.01) | |
| *B29D 7/01* | (2006.01) | |
| *B29K 29/00* | (2006.01) | |
| *B29K 105/00* | (2006.01) | |

(52) U.S. Cl.
CPC ............. *C08K 5/11* (2013.01); *B29D 7/01* (2013.01); *B29K 2029/14* (2013.01); *B29K 2105/0032* (2013.01); *B29K 2995/002* (2013.01); *B29K 2995/003* (2013.01)

(58) Field of Classification Search
CPC ... C08K 3/32; C08K 3/34; C08K 5/11; C08K 9/02; C08K 9/10; B29D 7/01
USPC ........ 524/439, 440, 441, 449; 523/135, 210, 523/333
See application file for complete search history.

(56) References Cited

U.S. PATENT DOCUMENTS

| | | | |
|---|---|---|---|
| 2,282,026 A | | 5/1942 | Bren et al. |
| 2,282,057 A | | 5/1942 | Hopkins et al. |
| 3,876,552 A | * | 4/1975 | Moynihan ......... B32B 17/10174 252/582 |
| 5,137,954 A | | 8/1992 | DasGupta et al. |
| 5,487,939 A | | 1/1996 | Phillips et al. |
| 5,728,472 A | | 3/1998 | D'Errico |
| 5,972,280 A | | 10/1999 | Hoagland |
| 2003/0161997 A1 | | 8/2003 | Moran |
| 2009/0162671 A1 | | 6/2009 | Marumoto |
| 2011/0059320 A1 | | 3/2011 | Il et al. |
| 2011/0268931 A1 | | 11/2011 | Van Der Meulen et al. |
| 2012/0085482 A1 | * | 4/2012 | Cadwallander ... B32B 17/10018 156/104 |
| 2012/0135191 A1 | | 5/2012 | Spangler et al. |
| 2012/0325396 A1 | | 12/2012 | Toyama et al. |

FOREIGN PATENT DOCUMENTS

WO    2001000404 A1    1/2001

OTHER PUBLICATIONS

Wade, B.E., Vinyl Acetal Polymers, in Encyclopedia of Polymer Science & Technology, 3$^{rd}$ edition, vol. 8, pp. 381-399, 2003.
Notification of Transmittal of the International Search Report and the Written Opinion of the International Searching Authority or the declaration date of mailing Oct. 30, 2015, received in International Application No. PCT/US2015/046010, Filing Date: Aug. 20, 2015.

* cited by examiner

*Primary Examiner* — Edward Cain
(74) *Attorney, Agent, or Firm* — Michelle Bugbee; Dennis V. Carmen (57) ABSTRACT

An interlayer comprised of a thermoplastic resin and at least one special effect metal pigment. The use of a thermoplastic resin and at least one special effect metal pigment provides a special effect metal appearance without sacrificing other characteristics of the interlayer, and wherein the color of the interlayer measured in reflectance mode is different from the color measured in transmission mode.

18 Claims, 2 Drawing Sheets

POLYMER INTERLAYERS COMPRISING SPECIAL EFFECT METAL PIGMENTS

CROSS REFERENCE TO RELATED APPLICATION(S)

This Application claims the benefit of U.S. Provisional Patent Application Ser. No. 62/040,388, filed Aug. 21, 2014, the entire disclosure of which is incorporated by reference herein.

BACKGROUND OF THE INVENTION

1. Field of the Invention

This disclosure is related to the field of polymer interlayers for multiple layer panels and multiple layer panels having at least one polymer interlayer sheet. Specifically, this disclosure is related to the field of special effect metal pigments for use in polymer interlayers and polymer interlayers comprising special effect metal pigments

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes. These applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may, among other things, give the glass a much higher sound insulation rating, reduce UV and/or IR light transmission, or enhance the aesthetic appeal of the associated window. The interlayer may be a single layer, a combination of two or more single layers, a multilayer that has been coextruded, a combination of at least one single layer and at least one multilayer, or a combination of multilayer sheets. In regard to the photovoltaic applications, the main function of the interlayer is to encapsulate the photovoltaic solar panels which are used to generate and supply electricity in commercial and residential applications.

Laminated safety glass, or multiple layer glass panels, is used in many different applications in the transportation industry, including automotive, railroad, and aviation vehicles. Polymer interlayers used in laminated safety glass have also been used in architectural or building applications as, for example, panels for windows in buildings or stadiums, balustrades, decorative panels (such as in offices), and the like. Such applications allow additional creativity by incorporating color and other decorative features into a design.

There is a need for improved interlayers for use in the windows and other panels where a metallic appearance is desirable. There is also a need for improved interlayers with a visible surface texture or appearance. There is also a need for interlayers having a metallic appearance that can be used in combination with other interlayers, such as other colors, to provide more colors and appearances in laminated glass panels. There is also a need for interlayers for use in glass panels to provide privacy boundaries between adjacent rooms or areas. There is also a need for glazings, and particularly colored glazings, having a metallic type reflection to provide near infrared absorbance to reduce solar heat load from the environment.

Interlayers for windshields and other multiple layer glass panel applications are generally produced by mixing a polymer resin (or resins) such as poly(vinyl butyral) with one or more plasticizers and other additives and melt processing the mix into a sheet by any applicable process or method known to one of skill in the art, including, but not limited to, extrusion. For multiple layer interlayers comprising two or more layers, the layers may be combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Contemplated polymer interlayers include, but are not limited to, poly(vinyl)acetal resins such as poly(vinyl butyral) (PVB), polyurethane (PU), poly(ethylene-co-vinyl acetate) (EVA), polyvinylchloride (PVC), polyethylenes, polyolefins, ethylene acrylate ester copolymers, poly(ethylene-co-butyl acrylate), silicone elastomers, epoxy resins and any acid copolymers and ionomers derived from any of the foregoing possible thermoplastic resins. Multilayer laminates can include multiple layer glass panels and multilayer polymer films. In certain embodiments, the multiple polymer films in the multilayer laminates may be laminated together to provide a multilayer film or interlayer. In certain embodiments, these polymer films may have coatings, such as metal, silicone or other applicable coatings known to those of ordinary skill in the art. The individual polymer films which comprise the multilayer polymer films may be laminated together using an adhesive as known to those of ordinary skill in the art.

The following offers a simplified general description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon, particularly in architectural and/or building applications such as windows in buildings, interior or exterior panels, balustrades, and the like, for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by, for example, a high temperature and pressure lamination process known to one of ordinary skill in the art such as, but not limited to, autoclaving, or by other processes known to one of ordinary skill in the art.

One of the problems in the manufacture of multilayer laminate glass panels is the presence of various optical defects in the final unitary structure or laminate, such as the window or panel. The multiple layer glass panels need to be free of optical defects and have consistent color or tone. Additionally, the multiple layer glass panels need to be aesthetically pleasing, that is, the glass panels cannot have flow lines or other undesirable manufacturing defects. It is important to maintain the high optical standards when adding new features and functionality to the glass panels.

Optical quality defects such as flow lines, inconsistent pigmentation, and other defects such as (but not limited to) extruded contamination and inconsistent sheet thickness and/or surface roughness are common problems in the field of multiple layer glass panels. Good optical quality is particularly important where the multiple layer glass panels are those used in applications which require higher levels of optical or visual quality, such as windows. In an attempt to improve the multiple layer glass panels used in windows and other glazing applications, and particularly in an attempt to make them more aesthetically pleasing to the consumer, new colors and features are constantly being developed. One attempt to improve the technology is the use of additional colors and/or pigments in the window or panel, such as metallic pigments. Using a metallic pigment in an interlayer has potential advantages over interlayers without metallic pigments, such as the ability to provide additional colors as well as reflectivity and other features, however, the use of the metallic pigments results in other unfavorable sacrifices, including, but not limited to, uneven distribution of the pigments on and/or in the interlayer, poor optical quality or visual defects, poor (too high or too low) adhesion, and increased manufacturing costs (i.e., the costs associated with producing the multilayer interlayer as well as the cost of the pigment). The use of metallic pigments in an interlayer also eliminates the need to use a metallic film either laminated in the panel or applied to a glass laminate panel to provide the reflectivity and other properties. The use of metallic pigments in an interlayer may also provide some near infrared reflectance and absorbance to reduce the solar heat load from entering a building. Accordingly, there is a need in the art for the development of an interlayer having a special effect metal pigment that provides an interlayer having a metallic color and reflective appearance as well as a textured surface without a reduction in optical, mechanical, and performance characteristics of an interlayer.

SUMMARY OF THE INVENTION

Because of these and other problems in the art, described herein, among other things is a polymer interlayer that has a metallic color, such as silver, gold, bronze, copper, brass, or any other known color or combination of colors with a metallic appearance, or specifically, in some embodiments, is silver or gold. In an embodiment, a interlayer comprises: poly(vinyl butyral) resin, a plasticizer, and from about 0.01 to 5.0 pounds per hundred resin of a metal pigment, wherein the interlayer has a percent reflection (% R) of at least about 10% (as measured by ASTM E1164 with the specular component excluded). In embodiments, the color of the interlayer (as determined by L*a*b*) as measured in reflectance mode is different from the color of the interlayer as measured in transmission mode (ASTM E1164 for transmission mode measurements). In embodiments, interlayer is silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In embodiments, the metal pigment has a particle size (d50) of from about 1 micron to about 80 microns, or about 2 microns to about 70 microns, or about 3 microns to about 60 microns, or about 4 microns to about 50 microns, or about 5 microns to about 40 microns, or 1 micron or greater, or 2 microns or greater, or 3 microns or greater, or 4 microns or greater, or 5 microns or greater, or 80 microns or less, or 75 microns or less, or 70 microns or less, or 65 microns or less, or 60 microns or less, or 55 microns or less, or 50 microns or less, or 45 microns or less, or 40 microns or less.

In embodiments, the interlayer comprises from about 0.05 to 2.5 pounds per hundred resin of a metal pigment, or from about 0.1 to 2.0 phr, or 0.01 phr or greater, or 0.02 phr, or 0.03 phr or greater, or 0.04 phr resin or greater, or 0.05 phr or greater, or 0.06 phr or greater, or 0.07 phr or greater, or 0.08 phr or greater, or 0.09 phr or greater, or 0.1 phr or greater, or 5.0 phr or less, or 4.9 phr or less, or 4.8 phr or less, or 4.7 phr or less, or 4.6 phr or less, or 4.5 phr or less, or 4.4 phr or less, or 4.3 phr or less, or 4.2 phr or less, or 4.1 phr or less, or 4.0 phr or less, or 3.9 phr or less, or 3.8 phr or less, or 3.7 phr or less, or 3.6 phr or less, or 3.5 phr or less, or 3.4 phr or less, or 3.3 phr or less, or 3.2 phr or less, or 3.1 phr or less, or 3.0 phr or less, or 2.9 phr or less, or 2.8 phr or less, or 2.7 phr or less, or 2.6 phr or less, or 2.5 phr or less, or 2.4 phr or less, or 2.3 phr or less, or 2.2 phr or less, or 2.1 phr or less, or 2.0 phr or less.

In embodiments, the interlayer has a percent reflection (% R) of at least about 15% (as measured by ASTM E1164 with the specular component excluded), or at least about 20%, or at least about 25%, or at least about 30%, or at least about 35%, or less than about or at least about 40%, or less than about or at least about 35%, or less than about or at least about 30%, or from about 10% to about 40%.

In another embodiment, an interlayer comprises: poly (vinyl butyral) resin, a plasticizer, and from about 0.01 to 5.0 pounds per hundred resin of a metal pigment having a particle size (d50) of from about 1 micron to about 80 microns, wherein the interlayer has a percent reflection (% R) of at least 10% (as measured by ASTM E1164 with the specular component excluded). In embodiments, the color of the interlayer (as determined by L*a*b*) as measured in reflectance mode is different from the color of the interlayer as measured in transmission mode (ASTM E1164). In embodiments, interlayer is silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In embodiments, the metal pigment has a particle size (d50) of from about 2 microns to about 70 microns, or about 3 microns to about 60 microns, or about 4 microns to about 50 microns, or about 5 microns to about 40 microns, or 1 micron or greater, or 2 microns or greater, or 3 microns or greater, or 4 microns or greater, or 5 microns or greater, or 80 microns or less, or 75 microns or less, or 70 microns or less, or 65 microns or less, or 60 microns or less, or 55 microns or less, or 50 microns or less, or 45 microns or less, or 40 microns or less.

In embodiments, the interlayer comprises from about 0.05 to 2.5 pounds per hundred resin of a metal pigment, or from about 0.1 to 2.0 phr, or 0.01 phr or greater, or 0.02 phr, or 0.03 phr or greater, or 0.04 phr resin or greater, or 0.05 phr or greater, or 0.06 phr or greater, or 0.07 phr or greater, or 0.08 phr or greater, or 0.09 phr or greater, or 0.1 phr or greater, or 5.0 phr or less, or 4.9 phr or less, or 4.8 phr or less, or 4.7 phr or less, or 4.6 phr or less, or 4.5 phr or less, or 4.4 phr or less, or 4.3 phr or less, or 4.2 phr or less, or 4.1 phr or less, or 4.0 phr or less, or 3.9 phr or less, or 3.8 phr or less, or 3.7 phr or less, or 3.6 phr or less, or 3.5 phr or less, or 3.4 phr or less, or 3.3 phr or less, or 3.2 phr or less, or 3.1 phr or less, or 3.0 phr or less, or 2.9 phr or less, or 2.8 phr or less, or 2.7 phr or less, or 2.6 phr or less, or 2.5 phr or less, or 2.4 phr or less, or 2.3 phr or less, or 2.2 phr or less, or 2.1 phr or less, or 2.0 phr or less.

In embodiments, the interlayer has a percent reflection (% R) of at least about 15% (as measured by ASTM E1164 with the specular component excluded), or at least about 20%, or at least about 25%, or at least about 30%, or at least about 35%, or less than about or at least about 40%, or less than about or at least about 35%, or less than about or at least about 30%, or from about 10% to about 40%.

In another embodiment, a laminate comprises: a glass panel, an interlayer comprising: poly(vinyl butyral) resin, a plasticizer, and from about 0.01 to 5.0 pounds per hundred resin of a metal pigment, wherein the interlayer has a percent reflection (% R) of at least about 10% (as measured by ASTM E1164 with the specular component excluded), and a glass panel, wherein the laminate has a textured appearance. In embodiments, the color of the interlayer (as determined by L*a*b*) as measured in reflectance mode is different from the color of the interlayer as measured in transmission mode (ASTM E1164). In embodiments, interlayer is has a metallic appearance, such as silver, gold, bronze, copper, brass, or any other known color or combination of colors with a metallic appearance, or specifically, in some embodiments, silver or gold. In embodiments, the interlayer comprises a single layer, and in other embodiments, the interlayer comprises multiple layers.

In embodiments, the metal pigment has a particle size (d50) of from about 1 micron to about 80 microns, or from about 2 microns to about 70 microns, or about 3 microns to about 60 microns, or about 4 microns to about 50 microns, or about 5 microns to about 40 microns, or 1 micron or greater, or 2 microns or greater, or 3 microns or greater, or 4 microns or greater, or 5 microns or greater, or 80 microns or less, or 75 microns or less, or 70 microns or less, or 65 microns or less, or 60 microns or less, or 55 microns or less, or 50 microns or less, or 45 microns or less, or 40 microns or less.

In embodiments, the interlayer comprises from about 0.05 to 2.5 pounds per hundred resin of a metal pigment, or from about 0.1 to 2.0 phr, or 0.01 phr or greater, or 0.02 phr, or 0.03 phr or greater, or 0.04 phr resin or greater, or 0.05 phr or greater, or 0.06 phr or greater, or 0.07 phr or greater, or 0.08 phr or greater, or 0.09 phr or greater, or 0.1 phr or greater, or 5.0 phr or less, or 4.9 phr or less, or 4.8 phr or less, or 4.7 phr or less, or 4.6 phr or less, or 4.5 phr or less, or 4.4 phr or less, or 4.3 phr or less, or 4.2 phr or less, or 4.1 phr or less, or 4.0 phr or less, or 3.9 phr or less, or 3.8 phr or less, or 3.7 phr or less, or 3.6 phr or less, or 3.5 phr or less, or 3.4 phr or less, or 3.3 phr or less, or 3.2 phr or less, or 3.1 phr or less, or 3.0 phr or less, or 2.9 phr or less, or 2.8 phr or less, or 2.7 phr or less, or 2.6 phr or less, or 2.5 phr or less, or 2.4 phr or less, or 2.3 phr or less, or 2.2 phr or less, or 2.1 phr or less, or 2.0 phr or less.

In embodiments, the interlayer has a percent reflection (% R) of at least about 15% (as measured by ASTM E1164 with the specular component excluded), or at least about 20%, or at least about 25%, or at least about 30%, or at least about 35%, or less than about or at least about 40%, or less than about or at least about 35%, or less than about or at least about 30%, or from about 10% to about 40%.

In an additional embodiment, a method for making a reflective poly(vinyl butyral) sheet comprises: providing a first poly(vinyl butyral) resin in a first amount; providing a first plasticizer in a second amount; providing a first metal pigment in a third amount; melt blending the first amount of the first poly(vinyl butyral) resin with the second amount of the first plasticizer and the third amount of the metal pigment to create a poly(vinyl butyral) melt blend; and extruding the poly(vinyl butyral) melt blend into a poly(vinyl butyral) sheet; wherein the poly(vinyl butyral) sheet has a percent reflection (% R) of at least 10% (as measured by ASTM E1164 with the specular component excluded). In embodiments, the color of the interlayer (as determined by L*a*b*) as measured in reflectance mode is different from the color of the interlayer as measured in transmission mode (ASTM E1164). In embodiments, interlayer is silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In embodiments, the metal pigment has a particle size (d50) of from about 1 micron to about 80 microns, or from about 2 microns to about 70 microns, or about 3 microns to about 60 microns, or about 4 microns to about 50 microns, or about 5 microns to about 40 microns, or 1 micron or greater, or 2 microns or greater, or 3 microns or greater, or 4 microns or greater, or 5 microns or greater, or 80 microns or less, or 75 microns or less, or 70 microns or less, or 65 microns or less, or 60 microns or less, or 55 microns or less, or 50 microns or less, or 45 microns or less, or 40 microns or less.

In embodiments, the interlayer comprises from about 0.05 to 2.5 pounds per hundred resin of a metal pigment, or from about 0.1 to 2.0 phr, or 0.01 phr or greater, or 0.02 phr, or 0.03 phr or greater, or 0.04 phr resin or greater, or 0.05 phr or greater, or 0.06 phr or greater, or 0.07 phr or greater, or 0.08 phr or greater, or 0.09 phr or greater, or 0.1 phr or greater, or 5.0 phr or less, or 4.9 phr or less, or 4.8 phr or less, or 4.7 phr or less, or 4.6 phr or less, or 4.5 phr or less, or 4.4 phr or less, or 4.3 phr or less, or 4.2 phr or less, or 4.1 phr or less, or 4.0 phr or less, or 3.9 phr or less, or 3.8 phr or less, or 3.7 phr or less, or 3.6 phr or less, or 3.5 phr or less, or 3.4 phr or less, or 3.3 phr or less, or 3.2 phr or less, or 3.1 phr or less, or 3.0 phr or less, or 2.9 phr or less, or 2.8 phr or less, or 2.7 phr or less, or 2.6 phr or less, or 2.5 phr or less, or 2.4 phr or less, or 2.3 phr or less, or 2.2 phr or less, or 2.1 phr or less, or 2.0 phr or less.

In embodiments, the interlayer has a percent reflection (% R) of at least about 15% (as measured by ASTM E1164 with the specular component excluded), or at least about 20%, or at least about 25%, or at least about 30%, or at least about 35%, or less than about or at least about 40%, or less than about or at least about 35%, or less than about or at least about 30%, or from about 10% to about 40%.

In certain embodiments, the rigid substrate (or substrates) is glass. In other embodiments, the panel may further comprise a photovoltaic cell, with the interlayer encapsulating the photovoltaic cell. In other embodiments, the panel may further comprise a film, with or without coatings, such as reflective coatings or coatings that absorb UV.

DESCRIPTION OF THE PREFERRED EMBODIMENT(S)

Described herein, among other things, are interlayers comprised of a thermoplastic resin, a plasticizer, and at least one special effect metal pigment, wherein the interlayer has a metallic appearance and reflectivity, a textured surface, good optical properties and minimal change or reduction in other properties such that the other properties are acceptable.

In an embodiment, a interlayer comprises: poly(vinyl butyral) resin, a plasticizer, and from about 0.01 to 5.0 pounds per hundred resin of a metal pigment, wherein the interlayer has a percent reflection (% R) of at least about 10% (as measured by ASTM E1164 with the specular component excluded). In embodiments, the color of the interlayer (as determined by L*a*b*) as measured in reflectance mode is different from the color of the interlayer as measured in transmission mode (ASTM E1164). In embodiments, interlayer is silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In another embodiment, an interlayer comprises: poly(vinyl butyral) resin, a plasticizer, and from about 0.01 to 5.0 pounds per hundred resin of a metal pigment having a particle size (d50) of from about 1 micron to about 80 microns, wherein the interlayer has a percent reflection (% R) of at least 10% (as measured by ASTM E1164 with the specular component excluded). In embodiments, the color of the interlayer (as determined by L*a*b*) as measured in reflectance mode is different from the color of the interlayer as measured in transmission mode (ASTM E1164). In embodiments, interlayer has a metallic appearance, such as silver, gold, bronze, copper, brass, or any other known color or combination of colors with a metallic appearance, or specifically, in some embodiments, is silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In another embodiment, a laminate comprises: a glass panel, an interlayer comprising: poly(vinyl butyral) resin, a plasticizer, and from about 0.01 to 5.0 pounds per hundred resin of a metal pigment, wherein the interlayer has a percent reflection (% R) of at least 10% (as measured by ASTM E1164 with the specular component excluded), and a glass panel, wherein the laminate has a textured appearance. In embodiments, the color of the interlayer (as determined by L*a*b*) as measured in reflectance mode is different from the color of the interlayer as measured in transmission mode (ASTM E1164). In embodiments, interlayer has a metallic appearance, such as silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

In an additional embodiment, a method for making a reflective poly(vinyl butyral) sheet comprises: providing a first poly(vinyl butyral) resin in a first amount; providing a first plasticizer in a second amount; providing a first metal pigment in a third amount; melt blending the first amount of the first poly(vinyl butyral) resin with the second amount of the first plasticizer and the third amount of the metal pigment to create a poly(vinyl butyral) melt blend; and extruding the poly(vinyl butyral) melt blend into a poly(vinyl butyral) sheet; wherein the poly(vinyl butyral) sheet has a percent reflection (% R) of at least 10% (as measured by ASTM E1164 with the specular component excluded), and wherein the poly(vinyl butyral) sheet has a surface formed by melt fracture, and further wherein the poly(vinyl butyral) sheet is embossed prior to cooling the sheet. In embodiments, the color of the interlayer (as determined by L*a*b*) as measured in reflectance mode is different from the color of the interlayer as measured in transmission mode (ASTM E1164 with the specular component excluded). In embodiments, interlayer has a metallic appearance, such as silver, gold, bronze, copper, brass, or any other known color or combination of colors with a metallic appearance, or specifically, in some embodiments, is silver or gold. In embodiments, the interlayer comprises a single layer, and in other embodiments, the interlayer comprises multiple layers.

The use of a thermoplastic resin, a plasticizer, and at least one special effect metal pigment, when melt-extruded, and optionally, hot melt embossed (prior to cooling the sheet after extrusion), creates an interlayer having a metallic appearance and reflectivity as well as a textured surface appearance without sacrificing other physical and optical characteristics. As used herein, "reflectivity" means a portion of light waves that neither pass through nor get absorbed by the interlayer but rather bounce back toward the light source either directly or at some other angle to the light source.

Polymer interlayers often comprise many different additives for many different functions. For example, colorants such as dyes or pigments (in addition to any special effect metal pigments or metallic pigment(s)) may be added to change the color of all or part of the interlayer. Adhesion control agents may be added to help control the level of adhesion that the polymer interlayer has to glass or other substrates. Other additives, such as anti-blocking agents, infrared ("IR") absorbing agents, ultraviolet ("UV") absorbing agents, as well as many other additives known to one skilled in the art, may be included. Special effect metallic pigments may be added to a polymer interlayer to provide special properties under certain lighting conditions. The special effect metallic pigments (as well as any other additives) may be added to one or more layers of the polymer interlayer. Addition of the special effect metallic pigment provides a visual effect or improved appearance and colors not previously available in an interlayer. The use of a special effect metallic pigment can provide various different effects due to the reflection, refraction and/or transparency of the special effect metallic pigments and the final interlayer sheet. Depending on the angle of observation, the appearance and effect of the metallic pigment will change, and interlayers having such colors as silver, gold, bronze, copper, brass, metal, and earth tones, as well as any combination of pigments that create a color having a metallic appearance can be produced. The use of special effect metal pigments also provides an interlayer having the ability to produce a distinct textured surface appearance in a glass laminate.

Previous attempts to provide a metallic or metallized appearance to interlayers have been made by combining a metallized film with the interlayer sheet in a window or panel or by applying a metallized film to a window or panel. Titanium dioxide (TiO$_2$) has also previously been used interlayers to provide a uniform opacity and a white reflective color to the interlayer. The main purpose of providing an opaque interlayer is to prevent any light, or much of the light, from passing through the interlayer, such as light in the UV, visible, and NIR wavelengths.

In order to provide a more uniform distribution of the special effect metallic pigments, the metallic pigments were added to the raw materials prior to extrusion of the polymer interlayer to allow for more uniform mixing and distribution of the metallic pigments throughout the entire polymer interlayer. The special effect metallic pigments may be added, for example, to the plasticizer (along with other additives, as desired), and the plasticizer and additives are mixed, and this mixture of plasticizer and additives (as desired) is then mixed with the resin and extruded. Once extruded, it was previously noted that the pigments were not evenly dispersed or tended to clump or aggregate or cause flow defects, as further described below. Previous attempts to use metallic pigments led to inconsistent reflective appearance and often produced an interlayer having a cloudy or hazy appearance.

As used herein, the terms "metal pigment", "special effect metal pigment", "metallic pigment", and "special effect metallic pigment" may be used interchangeably and refer to any pigment that has at least one metal element or oxides thereof as a component. These pigments can be obtained either as a homogenous composition or as a coating applied to another substrate. A particulate substrate with a large aspect ratio provides an excellent means to reflect light in an oriented manner. As used herein, the terms "metallic" and "metallized" may be used interchangeably throughout this description. By comparison, a non-metallic or non-metallized pigment does not contain a metal or other metal oxide as a component of the pigment. Any suitable metallic pigment can be used as long as it does not significantly adversely affect the desired properties of the interlayer or the desired application and is selected depending on the final color and properties desired, such as interfering with other components in the polymer interlayer, such as interfering with UV absorbers, increasing or decreasing adhesion levels, causing discoloration, causing optical or manufacturing defects, and the like. An example of suitable pigments includes, but is not limited to, mica based pigments coated with at least one metal oxide. Examples of suitable metal oxides include, but are not limited to, silver oxide, iron oxide, chromium oxide and tin oxide. Other examples of special effect metal pigments include aluminum flakes or other substrates consisting of such materials as silicon dioxide and aluminum oxide that can be coated with suitable colorants.

In embodiments, the special effect metallic pigment must be compatible with poly(vinyl butyral), plasticizer and other additives used in interlayers. That is, the metallic pigment(s) cannot react (such as chemically react or cause a chemical reaction) or change with exposure to the other raw materials used to produce the interlayer, such as for example, oxidizing, changing color, changing transparency or opacity, or altering adhesive properties.

In some applications, the special effect metallic pigment may be combined with a suitable solvent or binder if desired, particularly if the pigment is to be applied as a coating. Examples of suitable solvents include, but are not limited to, polar and non-polar solvents such as alcohols, esters, ketones, halogen containing organic solvents and hydrocarbon solvents. Examples of suitable binders include, but are not limited to, solvent based and aqueous adhesives, such as polyurethanes, epoxies, polyesters, acrylics, anhydride modified polyolefins and blends thereof. The pigment may also be dispersed in a binding polymer matrix. When the special effect metal pigment is mixed with other components and extruded into an interlayer sheet, a solvent or binder may not be necessary. Instead, the special effect metal pigment may be mixed with other raw materials, such as plasticizer, or with other powders, as desired. The special effect metal pigments can be processed into concentrated paste dispersions or even dispersed into PVB resin and extruded into a concentrated PVB colored pellet. The introduction of special effect metal pigments into PVB resin can be by dry powder addition or a wetted dispersion, or any other method known to one skilled in the art so long as adequate mixing is provided to minimize or prevent agglomeration and aggregation of the pigments.

In an embodiment, the special effect metallic pigment may be a thin platelet or plate-like mica pigment coating with a very thin layer of a metal oxide(s) and having a particle size in the range of from about 1 to about 80 microns, or from about 5 microns to about 40 microns, or greater than about 1 micron, or greater than about 2 microns, or greater than about 3 microns, or greater than about 4 microns, or greater than about 5 microns, or less than about 80 microns, or less than about 75 microns, or less than about 70 microns, or less than about 65 microns, or less than about 60 microns, or less than about 55 microns, or less than about 50 microns, or less than about 45 microns, or less than about 40 microns. The mean size of the particles and the distribution of sizes can be varied to tailor the particles to achieve a desired reflective appearance. Examples of suitable include metallic pigments include the Iriodin® series of pigments (commercially available from EMD Chemicals), or any other metallic pigment that is suitable for extrusion. One or more pigments may be included, depending on the desired color and effect. Examples of metallic colors include, but are not limited to, gold, silver, copper, bronze, brass, pearl, blue, red, violet, yellow and combinations of the metallic colors.

The special effect metallic pigment is present in the polymer interlayer in an amount of from about 0.001 to about 10 pounds per hundred pounds resin (phr), from about 0.05 to 2.5 phr, or from about 0.1 to 2.0 phr, or 0.01 phr or greater, or 0.02 phr, or 0.03 phr or greater, or 0.04 phr resin or greater, or 0.05 phr or greater, or 0.06 phr or greater, or 0.07 phr or greater, or 0.08 phr or greater, or 0.09 phr or greater, or 0.1 phr or greater, or 5.0 phr or less, or 4.9 phr or less, or 4.8 phr or less, or 4.7 phr or less, or 4.6 phr or less, or 4.5 phr or less, or 4.4 phr or less, or 4.3 phr or less, or 4.2 phr or less, or 4.1 phr or less, or 4.0 phr or less, or 3.9 phr or less, or 3.8 phr or less, or 3.7 phr or less, or 3.6 phr or less, or 3.5 phr or less, or 3.4 phr or less, or 3.3 phr or less, or 3.2 phr or less, or 3.1 phr or less, or 3.0 phr or less, or 2.9 phr or less, or 2.8 phr or less, or 2.7 phr or less, or 2.6 phr or less, or 2.5 phr or less, or 2.4 phr or less, or 2.3 phr or less, or 2.2 phr or less, or 2.1 phr or less, or 2.0 phr or less. Other amounts may be used as desired, depending on the size of the pigment platelets or particles, the application, the desired appearance or effects and final properties. The individual platelets or particles of the metallic effect pigment, when included in the interlayer, should not be visible under normal light. The stacking of the special effect metal pigment particles in either an oriented or disoriented fashion provides the metallic appearance as well as the desired level of transparency, reflectivity, and sparkle.

The inventor has discovered that when a specific type of metallic pigment is mixed with the other raw materials (such as PVB and plasticizer) and then extruded at normal extrusion temperatures, the resulting polymer interlayer has a metallic color and appearance and a polymer interlayer having good optical quality may be produced. Overall roughness, pitch, pattern, waviness, and other parameters can ultimately affect the perceived visual appearance of the polymer interlayer having a special effect metallic pigment.

Surface roughness and surface pattern of a polymer interlayer can be controlled by melt fracture of the surface (as extruded) or by hot melt embossing of the surface after the polymer interlayer is formed (or both). In preferred embodiments, the combination of melt fracture formation of the surface followed by hot melt embossing is used to provide the desired surface properties. Without wishing to be bound by theory, it appears that the combination of hot melt embossing of the surface with melt fracture provides a synergy and results in an improved surface where the flakes or particles are oriented and "frozen" in place. Use of more traditional embossing processes, such as disclosed, for example, in U.S. Pat. No. 5,972,280 (the entirety of which is incorporated by reference herein), do not provide the desired effect as hot melt embossing processes (such as the process disclosed in US Application Publication No. 20120135191 A1, the entirety of which is incorporated by reference herein).

Use of the metallic pigment in the polymer interlayer provides the visual perception of a surface pattern or texture within a laminate structure without the need for additional (later) embossing of the surface. As used herein, "texture" refers to an appearance having a distinct roughness or otherwise uneven surface that is visible to the eye without the aid of magnification. When the special effect metallic pigment is added to the polymer and extruded, the metallic pigment (or flake) is generally aligned in the same plane (or in the machine direction) as the interlayer surface due to laminar forces attributed to extrusion and stretching. In close proximity to the surface of the polymer interlayer, the metallic pigment flakes or platelets become misaligned and are then "frozen" in place as the polymer melt becomes a polymer sheet (and the temperature of the polymer melt drops below the glass transition temperature ($T_g$)). It is believed that this is due to controlled melt fracture as the polymer is extruded. During subsequent lamination, the irregularities or peaks and valleys in the surface pattern are then forcibly flattened between glass substrates by applying heat and pressure, as further described below. The off angle (non-planar) metallic platelets follow the flow of the polymer melt and become nearly inverted to their original angle in relation to the polymer sheet surface, and as the polymer (and laminate) is cooled, the metallic platelets are again frozen in place to form the patterned angles. When viewed in reflectance mode, these angles formed by the metallic pigment provide the unique textured appearance of the polymer sheet. The multi-angle light reflectance provides desired light and color covering a wide field of view as opposed to just one specular component, such as may be found with a polished mirror. The multi-angle reflectance also provides a sense of depth within a glass laminate.

A mirror-like specular reflectance can be achieved by imparting a very smooth surface on both sides of the polymer interlayer. In certain circumstances, specular reflectance can be imposing and considered blinding. In polymer interlayers comprising special effect metallic pigments, the reflective color is only evident when observed within a narrow field of view.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present disclosure, a multilayered interlayer comprises at least two polymer layers (e.g., a single layer or multiple layers co-extruded) disposed in direct contact with each other, wherein each layer comprises a polymer resin, as detailed more fully below. As used herein, "skin layer" generally refers to outer layers of the interlayer and "core layer" generally refers to the inner layer(s). Thus, one exemplary embodiment would be: skin layer//core layer//skin layer. It should be noted, however, further embodiments include interlayers having more than three layers (e.g., 4, 5, 6, or up to 10 individual layers). Additionally, any multilayer interlayer utilized can be varied by manipulating the composition, thickness, or positioning of the layers and the like. For example, in one trilayer polymer interlayer sheet, the two outer or skin layers may comprise poly(vinyl butyral) ("PVB") resin with a plasticizer or mixture of plasticizers, while the inner or core layer may comprise the same or different PVB resin or different thermoplastic material with a plasticizer and/or mixture of plasticizers. Thus, it is contemplated that the skin layers and the core layer(s) of the multilayered interlayer sheets may be comprised of the same thermoplastic material or different thermoplastic materials. Either or both layers may include additional additives as known in the art, as desired.

Although the embodiments described below refer to the polymer resin as being PVB, it would be understood by one of ordinary skill in the art that the polymer may be any polymer suitable for use in a multiple layer panel. Typical polymers include, but are not limited to, PVB, polyurethane, polyvinyl chloride, poly(ethylene-co-vinyl acetate), combinations of the foregoing, and the like. PVB, poly(ethylene-co-vinyl acetate), and polyurethane are desirable polymers generally for interlayers; PVB is particularly desirable when used in conjunction with the interlayers of this disclosure comprising metallic pigments for use in windows and other glazing applications.

Some common components found in an interlayer, both generally and in interlayers of the present disclosure, and the formation thereof will be discussed. The PVB resin is produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a subsidiary of Eastman Chemical Company.

As used herein, residual hydroxyl content (calculated as PVOH) refers to the amount of hydroxyl groups remaining on the polymer chains after processing is complete. For example, PVB can be manufactured by hydrolyzing poly (vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral) resin, there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the poly(vinyl butyral) resin comprises about 8 to about 35 weight percent (wt. %) hydroxyl groups calculated as PVOH, about 13 to about 30 wt. %, about 9 to about 22 wt. %, about 15 to about 22 wt. %; about 16 to about 20 wt. %; or for certain embodiments, about 17.75 to about 19.85 wt. % hydroxyl groups calculated as PVOH. The resin can also comprise less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as a 2-ethyl hexanal acetal group, or a mix of butyraldehyde acetal, isobutyraldehyde acetal and 2-ethyl hexanal acetal groups (see, for example, U.S. Pat. No. 5,137,954, the entire disclosure of which is incorporated herein by reference).

For a given type of plasticizer, the compatibility of the plasticizer in the polymer is largely determined by the hydroxyl content of the polymer. Polymers with greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

The PVB resin (or resins) of the present disclosure typically has a molecular weight of greater than 50,000, about 50,000 to about 500,000 Daltons, about 70,000 to about 500,000 Daltons, about 80,000 to about 250,000 Daltons, less than about 500,000 Daltons, or less than about 250,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure. ACAs in the interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728, 472 (the entire disclosure of which is incorporated herein by reference), residual sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, other pigments (such as color pigments or titanium dioxide), stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

In various embodiments of interlayers of the present disclosure, the interlayer will comprise about 5 to about 100 phr (parts per hundred parts resin) total plasticizer. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

In some embodiments, the plasticizer has a hydrocarbon segment of fewer than 20, fewer than 15, fewer than 12, or fewer than 10 carbon atoms. Suitable plasticizers for use in these interlayers include esters of a polybasic acid or a polyhydric alcohol, among others. Suitable plasticizers include, for example, triethylene glycol di-(2-ethylhexanoate) ("3GEH"), tetraethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, and mixtures thereof. In some embodiments, the plasticizer is 3GEH.

In some embodiments, it may be desirable to change or increase the refractive index of the polymer interlayer (or a layer of the interlayer). One way to increase the refractive index of one of the interlayer or one of the layers is to use a high refractive index plasticizer. As used herein, a "high refractive index plasticizer" is a plasticizer having a refractive index of at least about 1.460. The refractive index of a commonly used plasticizer, such as 3GEH, is about 1.442, and the refractive indices of many other conventional plasticizers are from about 1.442 to about 1.449. Examples of plasticizers having a high refractive index that may be used in a polymer interlayer include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). The refractive index of poly(vinyl butyral) resin is approximately 1.485 to 1.495. Examples of high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, examples of high refractive index plasticizers are dipropylene glycol dibenzoate, 2,2,4-trimethyl-1,3-pentanediol dibenzoate, and tripropylene glycol dibenzoate.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the interlayer to the elastic state. In general, higher amounts of plasticizer loading will result in lower $T_g$. Conventional interlayers generally have a $T_g$ in the range of about 0° C. for acoustic (noise reducing) interlayer to about 45° C. for hurricane and aircraft interlayer applications. A particularly useful $T_g$ for certain embodiments is in the range of about 25° C. to about 45° C., or about 30° C. to about 35° C., or 30° C. to about 32° C., although other ranges may be applicable depending on the specific application or type of glazing.

Additionally, it is contemplated that polymer interlayer sheets as described herein may be produced by any suitable process known to one of ordinary skill in the art of producing polymer interlayer sheets that are capable of being used in a multiple layer panel (such as a glass laminate or glass panel, a photovoltaic module or a solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate and photovoltaic module of the present invention are formed using processes known in the art.

Generally, in its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins, plasticizers and other additives (including the special effect metallic pigment) described above, are pre-mixed and fed into an extruder device. Additives such as colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

In the extruder device, the particles of the thermoplastic raw material, plasticizer, special effect metallic pigment(s) and any other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

The polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In some embodiments, the polymer melt sheet may be embossed after leaving the die, and prior to the cooling step, as previously discussed. In contrast to the polymer melt sheet, this polymer interlayer sheet is not in a molten state and is not highly viscous. Rather, it is the set final-form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 mils to 100 mils (about 0.38 mm to about 2.54 mm), about 15 mils to 60 mils (about 0.38 mm to about 1.52 mm), about 20 mils to about 50 mils (about 0.51 to 1.27 mm), about 15 mils to about 35 mils (about 0.38 to about 0.89 mm), and about 15 mils to about 30 mils (about 0.38 mm to about 0.76 mm), although the polymer interlayer sheet may also have a thickness greater than or less than any of these values, depending on the desired sheet and properties.

As noted above, the interlayers of the present disclosure may be used as a single-layer sheet or a multilayered sheet. The interlayers having a metallic pigment of the present invention may be used with one or more clear or colored interlayers to provide the desired laminate color(s) and appearance. In various embodiments, the interlayers of the present disclosure (either as a single-layer sheet, a multi-layered sheet, or as one or more layers of the same or different materials) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)//(polymer interlayer sheet)//(polymer film), where the polymer interlayer sheet can comprise multiple interlayers, as noted above. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass)//(polymer interlayer)//(photovoltaic cell)//(polymer interlayer)//(glass or polymer film).

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass)//(polymer interlayer sheet)//(glass), where the polymer interlayer sheet can comprise multilayered interlayers or multiple different single or multilayer interlayers, as noted above, and wherein at least one of the polymer interlayers (or layers therein) comprises a metallic pigment. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 70° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

One parameter often used to describe the polymer interlayers is the clarity, which is determined by measuring the haze value or percent haze (% Haze). Light that is scattered upon passing through a film or sheet of a material can produce a hazy or smoky field when objects are viewed through the material. Thus, the haze value is a quantification of the scattered light by a sample in contrast to the incident light. The test for percent haze is performed with a spectrophotometer such as the Ultrascan XE or Ultrascan PRO available from Hunter Associates (Reston, Va.), and in accordance with ASTM D1003-11 Procedure B using Illuminant C, at an observer angle of 2 degrees. Because of the nature and desired effect of the special effect metal pigments, % Haze is not as important as in other applications where optical clarity is desirable, such as in clear windows or windshields. Since the special effect metal pigments will provide some level of opacity and reflectance, the interlayers of the present disclosure generally will have a higher level of haze, such as a percent haze of greater than 30%. The interlayers of the present disclosure also have a typical transmission level (% T) of at least 2% and less than 40% (as measured on the HunterLab UltraScan XE). As with the haze or clarity, the level of transmission (% T) is not as important since the interlayers comprising the special effect metal pigments are desirably at least partially opaque. In some cases, the level of transmission does show that some light does pass through and not totally opaque. Reflectance or the level of reflection (% R) was also measured in conformance with ASTM E1164 and with the specular excluded configuration. The interlayers of the present invention desirably have a % R of greater than 5%, or at least 10%, or less than 50%, or less than 40%, although other reflectance values may be possible depending on the desired level of reflectance, color, thickness, end use as well as other factors.

The use of special effect metal pigments may change the adhesion response to glass and must be controlled accordingly with the use of adhesion control agents to provide the desired adhesion level depending on the particular application. Pummel adhesion is another parameter used to describe the polymer interlayers disclosed herein. The Pummel Adhesion Test is widely used throughout the world and has been a standard Solutia procedure for over 30 years. It measures the adhesion level of glass to the interlayer in a laminate construction. The interlayer to glass adhesion has a large effect on the impact resistance and long term stability of glass-interlayer structures. In this test, the laminates are cooled to 0° F. (−18° C.) and manually pummeled with a 1 lb. (0.45 kg) hammer on a steel plate at a 45 degree angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100% of the glass remains adhered to the interlayer. Pummel values are grouped and averaged for like specimens. Reported values state the average pummel value for the group and the maximum range of the pummel adhesion rating for individual surfaces. The interlayers of the present disclosure have a pummel adhesion rating of 2 or greater, or 8 or less, or from about 2 to about 8.

EXAMPLES

Samples of interlayer sheet having a metallic appearance were produced by mixing and melt-extruding PVB resin, plasticizer (38 phr triethylene glycol di-(2-ethylhexanoate) ("3GEH" plasticizer), and from about 0.5 to about 2.0 phr of a special effect metal pigment (as shown in Table 1), along with other common additives (including adhesion control agents and a UV stabilizer). The mix was extruded on a 1.25 inch extruder to form an interlayer sheet having a thickness of about 0.76 mm (30 gauge (30 mils)). Pigment concentrations of other extruded mixes were adjusted to provide similar effects with an interlayer sheet thickness of about 0.38 mm (15 mils) to show that thinner interlayers having similar properties could also be produced. The resulting polymer interlayers had the properties shown in Table 1.

TABLE 1

| Sample | Pigment | Color | Amount (phr) | % R | L* | a* | b* |
|---|---|---|---|---|---|---|---|
| 1 | Iriodin ® Gold | Gold | 0.83 | 25.21 | 57.28 | 3.69 | 53.85 |
| 2 | Iriodin ® Silver | Silver | 1.85 | 26.96 | 58.94 | −0.25 | 0.31 |

TABLE 2

| Sample | Pigment | Color | Amount (phr) | % T | L* | a* | b* | % Haze |
|---|---|---|---|---|---|---|---|---|
| 1 | Iriodin ® Gold | Gold | 0.83 | 26.54 | 58.55 | 2.32 | 20.81 | 78.2 |
| 2 | Iriodin ® Silver | Silver | 1.85 | 4.40 | 24.93 | 5.36 | 12.30 | 93.0 |

The color data (L*a*b*) as well as the % R and % T data in Table 1 and Table 2 show that the addition of a special effect metal pigment, such as Iriodin™ Gold or Iriodin™ Silver, provides a polymer interlayer having a metallic color, such as a silver or gold color, that has a significantly different appearance when viewed in reflection mode compared to the same interlayer when viewed normally. It also shows that the interlayers comprising special effect metal pigments reflect about 25% of the visible light.

Figure 1:
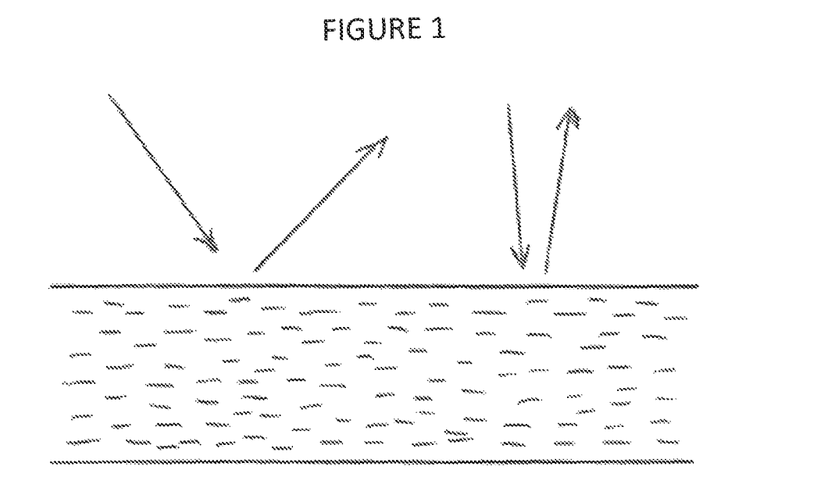
FIG. 1 provides a graphical illustration of the melt (as extruded) showing the alignment of the pigment particles in relation to the interlayer surface and how the alignment can affect the reflected portion of incident light.
Figure 2:
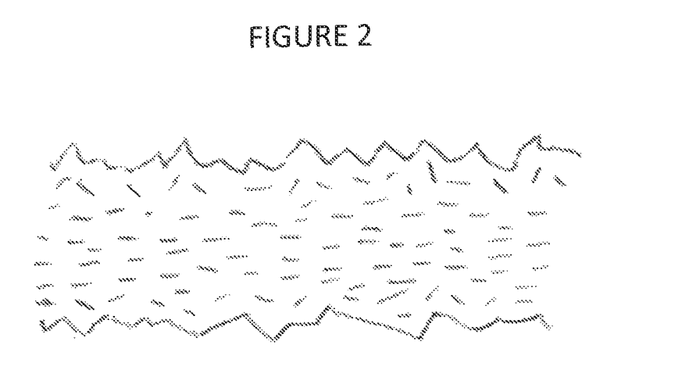
FIG. 2 provides a graphical illustration of the interlayer sheet showing the alignment of the pigment particles in relation to the interlayer surface and how the alignment can affect the reflected portion of incident light.
Figure 3:
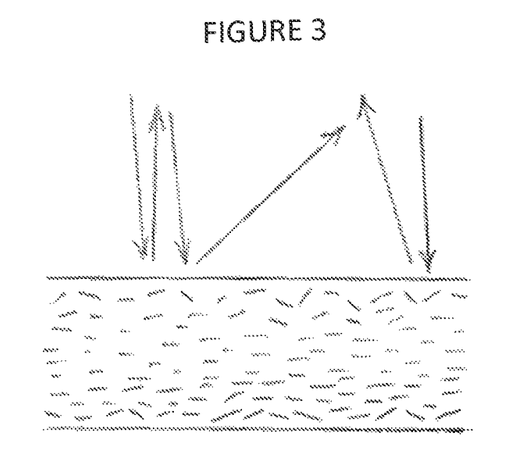
FIG. 3 provides another graphical illustration of the interlayer sheet as laminated (such as between glass substrates) showing the alignment of the pigment particles in relation to the interlayer surface and how the alignment can affect the reflected portion of incident light.

FIG. 1, FIG. 2 and FIG. 3 provide graphical illustrations showing the alignment of the pigment particles in relation to the interlayer surface (at various stages of production) and how the alignment can affect the reflected portion of incident light. FIG. 1 shows the pigments aligned in the direction of the flow of the melt (or the machine direction). FIG. 2 shows the alignment of the pigments in an extruded interlayer sheet as formed by melt fracture. FIG. 3 shows the alignment of the pigments after the interlayer sheet has been laminated (into a multiple layer panel or glazing). As shown by FIG. 1, as the poly(vinyl butyral) resin and pigments are extruded as a poly(vinyl butyral) melt, the pigments appear to be aligned in one direction (and appear to be parallel to the direction of the interlayer). As shown in FIG. 2, the pigment particles in the interlayer sheet as formed continue in the machine direction except for the pigment particles close to the surface, where the pigment particles closest to the surface are no longer aligned and appear to break the surface due to the melt fracturing during extrusion. The pigment particles at or near the surface are at an angle to the majority of the pigments in the interlayer sheet. As shown in FIG. 3, after lamination, when the interlayer flows between the glass (or other substrate), the pigments closest to the upper and lower surfaces remain misaligned (that is, they do not return to the parallel state as shown in FIG. 1), thereby forming the appearance of a textured surface. This textured surface would not normally be visible in an interlayer without the special effect metal pigments. The orientation of pigments having an aspect ratio near 1.0 will not preferentially reflect light in relation to the pigment orientation so irregularities will not be evident. Also, non-reflective pigments are mostly transparent so no significant reflection will occur to give the appearance of texture.

A smooth interlayer surface (or flow of particles) that maintains an orderly orientation of the pigment particles would have reflection off the smooth interlayer surface that is nearly specular in nature. As the melt is then extruded into an interlayer sheet, the melt fracture surface topography disrupts the natural parallel stacking alignment of the particles near the surfaces of the interlayer sheet, and this misalignment of the pigment particles causes the variable angle color and the reflectivity, and provides the illusion of three dimensional texturing (or the textured appearance) of the interlayer to the human eye.

In conclusion, the polymer interlayers having a special effect metal pigment as described herein have advantages over polymer interlayers without special effect metal pigments. These advantages or benefits include a high degree of reflectivity and a textured appearance. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizer in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:
1. An interlayer comprising:
   poly(vinyl butyral) resin,
   a plasticizer, and
   from about 0.01 to 5.0 pounds per hundred resin of a metal pigment, wherein the metal pigment comprises a mica based pigment coated with at least one metal oxide having a particle size (d50) of from about 1 micron to about 80 microns, wherein the interlayer has a percent reflection (% R) of at least about 10% (as measured by ASTM E1164 with the specular component excluded).
2. The interlayer of claim 1, wherein the color of the interlayer (as determined by L*a*b*) as measured in reflectance mode (ASTM E1164 with the specular component excluded) is different from the color of the interlayer as measured in transmission mode (ASTM E1164).

3. The interlayer of claim 1, wherein the interlayer is silver, gold, bronze, brass, copper, or blue.

4. The interlayer of claim 1, wherein the interlayer comprises a single layer.

5. The interlayer of claim 1, wherein the interlayer comprises multiple layers.

6. The interlayer of claim 1 comprising from about 0.1 to 2.0 pounds per hundred resin of a metal pigment.

7. The interlayer of claim 1, wherein the interlayer has a percent reflection (% R) of at least about 25% (as measured by ASTM E1164 with the specular component excluded).

8. The interlayer of claim 1, wherein the interlayer has a percent reflection (% R) of between about 10% and about 40% (as measured by ASTM E1164 with the specular component excluded).

9. An interlayer comprising:
poly(vinyl butyral) resin,
a plasticizer, and
from about 0.01 to 5.0 pounds per hundred resin of a metal pigment comprising a mica based pigment coated with at least one metal oxide having a particle size (d50) of from about 5 microns to about 40 microns,
wherein the interlayer has a percent reflection (% R) of at least 10% (as measured by ASTM E1164 with the specular component excluded).

10. The interlayer of claim 9, wherein the color of the interlayer (as determined by L*a*b*) as measured in reflectance mode (ASTM E1164 with the specular component excluded) is different from the color of the interlayer as measured in transmission mode (ASTM E1164).

11. The interlayer of claim 9 comprising from about 0.1 to 2.0 pounds per hundred resin of a metal pigment.

12. The interlayer of claim 9, wherein the interlayer has a percent reflection (% R) of at least about 25% (as measured by ASTM E1164 with the specular component excluded).

13. The interlayer of claim 9, wherein the interlayer has a percent reflection (% R) of between about 10% and about 40% (as measured by ASTM E1164 with the specular component excluded).

14. A method for making a reflective poly(vinyl butyral) sheet, the method comprising:
providing a first poly(vinyl butyral) resin in a first amount;
providing a first plasticizer in a second amount;
providing a first metal pigment in a third amount;
melt blending the first amount of the first poly(vinyl butyral) resin with the second amount of the first plasticizer and the third amount of the metal pigment to create a poly(vinyl butyral) melt blend; and
extruding the poly(vinyl butyral) melt blend into a poly(vinyl butyral) sheet;
wherein the poly(vinyl butyral) sheet comprises from about 0.01 to 5.0 pounds per hundred resin of a metal pigment having a particle size (d50) of from about 1 micron to about 80 microns;
wherein the poly(vinyl butyral) sheet has a percent reflection (% R) of at least 10% (as measured by ASTM E1164 with the specular component excluded), and wherein the poly(vinyl butyral) sheet has a surface formed by melt fracture, and further wherein the poly(vinyl butyral) sheet is embossed prior to cooling the sheet.

15. The method of claim 14, wherein the color of the poly(vinyl butyral) sheet (as determined by L*a*b*) as measured in reflectance mode (ASTM E1164 with the specular component excluded) is different from the color of the interlayer as measured in transmission mode (ASTM E1164).

16. The method of claim 14, wherein the poly(vinyl butyral) sheet comprises from about 0.1 to 2.0 pounds per hundred resin of a metal pigment having a particle size (d50) of from about 5 microns to about 40 microns.

17. The method of claim 14, wherein the poly(vinyl butyral) sheet has a percent reflection (% R) of between about 10% and about 40% (as measured by ASTM E1164 with the specular component excluded).

18. The method of claim 16, wherein the metal pigment has a particle size (d50) of from about 5 microns to about 40 microns.

* * * * *